United States Patent
Battershall et al.

[11] 3,721,366
[45] March 20, 1973

[54] GLASS TANK CONSTRUCTION

[76] Inventors: Barry W. Battershall, 2626 Natalie Drive; William F. Hoffman, 2904 Natalie Drive, both of Plano, Tex.

[22] Filed: Dec. 21, 1970

[21] Appl. No.: 99,779

[52] U.S. Cl. .................. 220/82 R, 220/71, 220/73, 119/5
[51] Int. Cl. ........................................... B65d 25/54
[58] Field of Search ............. 220/82 R, 73, 71; 119/5

[56] References Cited

UNITED STATES PATENTS

| | | | |
|---|---|---|---|
| 2,618,401 | 11/1952 | Wilkin | 220/71 X |
| 3,119,371 | 1/1964 | Zuckerman | 119/5 |
| 1,010,269 | 11/1911 | Klocke | 220/73 |
| 1,801,076 | 4/1931 | Ganzer | 220/71 |
| 3,083,686 | 4/1963 | Thorsell et al. | 119/5 X |
| 3,208,090 | 9/1965 | Roesel, Jr. | 119/5 X |

FOREIGN PATENTS OR APPLICATIONS

| | | | |
|---|---|---|---|
| 1,025,470 | 4/1966 | Great Britain | 119/5 |

Primary Examiner—M. Henson Wood, Jr.
Assistant Examiner—John J. Love
Attorney—Kenneth R. Glaser and John F. Booth

[57] ABSTRACT

A frameless aquarium assembled from non-corrosive material by utilizing an adhesive to attach and seal between the adjacent parts. The longer sides having brace members attached adjacent their upper edge. These brace members extend perpendicularly from the surface of the longer sides and can be attached together by a cross brace.

10 Claims, 6 Drawing Figures

*INVENTORS*
BARRY W. BATTERSHALL
WILLIAM F. HOFFMAN

*John F. Booth*
ATTORNEY

INVENTORS
BARRY W. BATTERSHALL
WILLIAM F. HOFFMAN

John F. Booth
ATTORNEY

GLASS TANK CONSTRUCTION

BACKGROUND OF THE INVENTION

The present invention relates generally to improvements in frameless aquariums and the like and more particularly to a new and improved tank construction wherein the longer sides are strengthened by use of lateral and cross braces.

DESCRIPTION OF THE PRIOR ART

Those concerned with the use, development and manufacture of aquariums have long recognized the need for large, strong and safe aquariums that can be constructed without utilizing an external metallic frame. Although aquariums constructed utilizing an external frame have served their purpose, they have not proved entirely satisfactory under all conditions of service for the following reasons. First, they are expensive to manufacture due to the material and labor required in the assembly of the frames. Second, the exterior frames are unattractive and tend to block the viewing of the corner portions of the tank. Third, the frames are normally constructed from metallic material and when the aquariums are used to hold salt water, caution must be taken to prevent contact between the frame and the salt water.

In the construction of small frameless glass tanks, it is simply a matter of selecting a suitable adhesive and attaching the sides and bottom together to form a water-tight aquarium. The serious problems arise in the construction of the larger aquariums, for example, aquariums having a capacity of fifty gallons and up. This problem is due to the force created by the water pressure tending to break the walls of the tank. To solve this problem, attempts have been made to use glass or plexiglass material for the walls of the tank, which is thicker and can withstand the force created by the water pressure. Although a suitable aquarium could be assembled by use of this thicker glass, considerable difficulty was encountered due to the fact that the completed tank was heavier due to the thicker glass, and the cost of manufacturing the aquarium was substantially increased. This causes the frameless tanks constructed with the thickened glass to be even more expensive than the framed tanks.

These frameless glass aquariums also suffer from the disadvantage of being extremely dangerous, in that if the tank should be accidentally struck by a hard object and one of the walls broken, the wall would tend to be propelled outward from the tank. It can be seen that when the tank is constructed from glass that a serious danger of injury would be present to individuals such as small children in the vicinity of the aquarium when it is broken.

SUMMARY OF THE INVENTION

The general purpose of this invention is to provide a frameless aquarium construction which embraces all the advantages of similarly employed frameless aquariums and possesses none of the aforedescribed disadvantages. To attain this, a system of lateral and cross braces are utilized in conjunction with thin aquarium walls so that breakage of the walls is prevented. The braces provide the additional advantage of preventing the glass walls of the aquarium from being projected outward if the walls should be broken by contact with a hard object.

OBJECTS OF THE INVENTION

An object of the present invention is the provision of a frameless aquarium construction.

Another object is to provide a frameless aquarium construction which can be utilized to construct large aquariums.

A further object of the invention is the provision of a safe aquarium construction.

Still another object is to provide an aquarium which is attractive in appearance yet is simple and inexpensive to manufacture.

Other objects and features of the invention will become apparent to those of ordinary skill in the art as the disclosure is made in the following description of preferred embodiments of the invention as illustrated in the accompanying drawings in which:

DESCRIPTION OF THE PREFERRED EMBODIMENT

Figure 1:
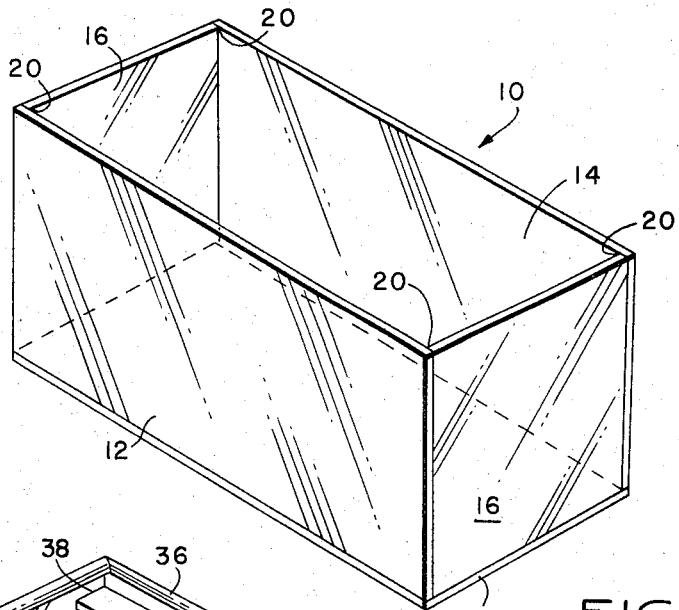
FIG. 1 is a perspective view of a frameless aquarium.

Referring now to the drawings wherein like referenced characters designate like or corresponding parts throughout the several views, there is shown in FIG. 1 a small aquarium generally designated as 10. This aquarium 10 has front and rear rectangular walls 12 and 14, respectively, square side walls 16 and a bottom 18. It is contemplated that the walls of this aquarium and the hereinafter described aquarium embodiments could be constructed from transparent material such as glass, plexiglass or the like thus enabling the contents of the aquarium to be viewed through the sides. It is also contemplated that one or more of the walls of the tank (such as for example the rear wall 14) could be reflective on their internal surface, thus providing a background for the contents of the aquarium.

As can be seen, the two side walls 16 are positioned in a spaced parallel relationship with their ends attached to and forming butt joints 20 with the interior surfaces of the front and rear walls 12 and 14, respectively. In a similar manner, the bottom 18 is attached to and butts against the bottom or lower edges of the four walls. Although in the present invention, selastic adhesive manufactured by Dow-Corning was utilized to attach and seal between the adjacent parts of the aquarium 10, it is to be understood of course that other adhesives could be utilized. From the foregoing description it can be realized that water-tight glass aquarium tanks can be assembled by using a suitable adhesive without the necessity of a frame.

Figure 2:
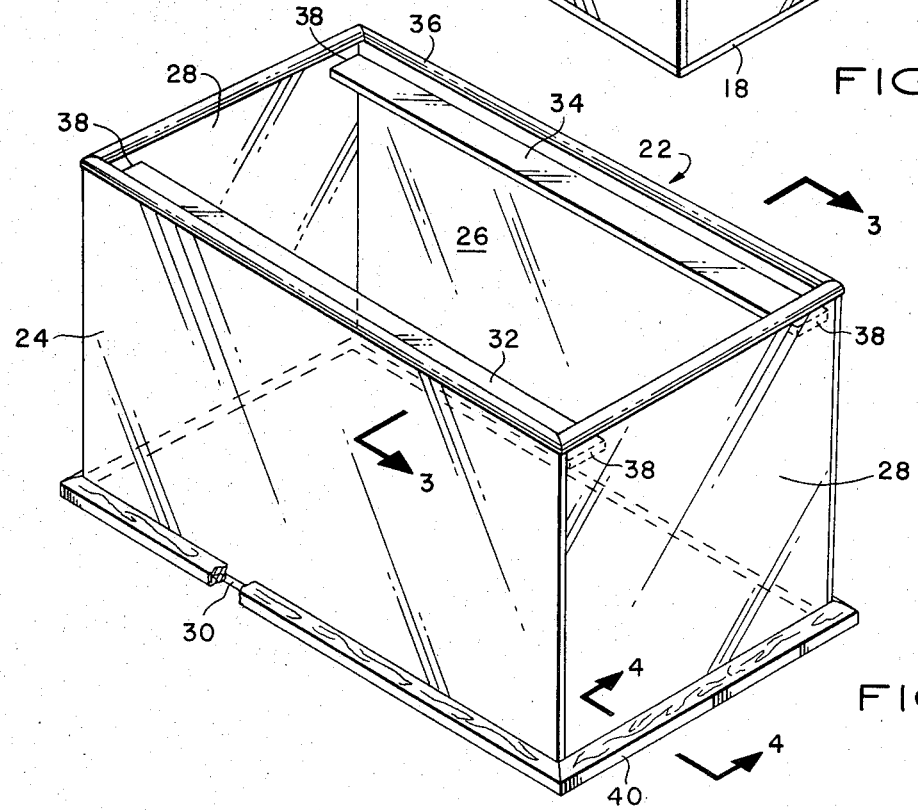
FIG. 2 is a perspective view of a second configuration of a frameless aquarium.

Turning now to FIG. 2, there is shown a larger aquarium 22 which is constructed without the necessity of an external frame. This tank can have external dimensions of 18 inches by 18 inches by 36 inches and can be constructed from ¼-inch thick glass, giving the tank approximately a fifty gallon capacity. It is to be understood of course that the aquarium embodiment illustrated in FIG. 2 could be constructed with different capacities and the fifty gallon embodiment is described herein for convenience only. The front, rear and side walls 24, 26 and 28, respectively and bottom 30 are assembled in a manner as described with respect to FIG. 1 by use of a suitable adhesive. Two lateral brace members 32 and 34 of a suitable non-corrosive material such as glass, plexiglass or the like are attached adjacent the upper edges of the front and rear walls 24 and 26, respectively, to strengthen these longer walls 24 and 26. The ends of these lateral brace members 32 and 34 are attached to the side walls 28 and 38.

Figure 3:
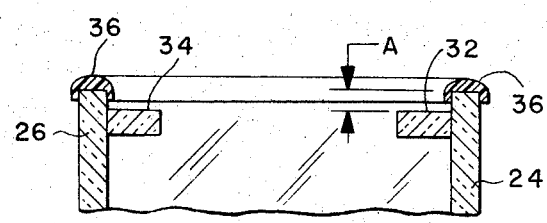
FIG. 3 is a section of the device taken on line 3-3 of FIG. 2 looking in the direction of the arrows.

As can be seen in FIG. 3, these lateral brace members 32 and 34 can be attached by adhesive to extend from the inside surfaces of the front and rear walls 24 and 26 respectively. The lateral brace members 32 and 34 are positioned a short distance A below the upper edge of the front and rear walls, but it is to be understood of course that these lateral brace members could be mounted flush with or even above the upper edge of the front and rear walls. In the present embodiment the lateral brace members 32 and 34 are positioned to allow clearance for the acrylic molding 36 which is mitered at the corners and positioned on the upstanding edge of the front, rear and side walls 24, 26 and 28 respectively. It is also envisioned that the spacing between the lateral brace members 32 and 34 could be selected to allow a standard aquarium cover and light to be mounted therebetween.

Figure 4:
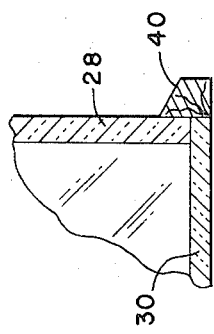
FIG. 4 shows a section of the device taken on line 4-4 of FIG. 2 looking in the direction of the arrows.

A decorative molding 40, which can be of wood or similar materials, is shown in FIG. 4 attached around the base of the tank to improve the appearance of the tank. This decorative molding 40 is mitered at the corners and extends completely around the tank.

Figure 5:
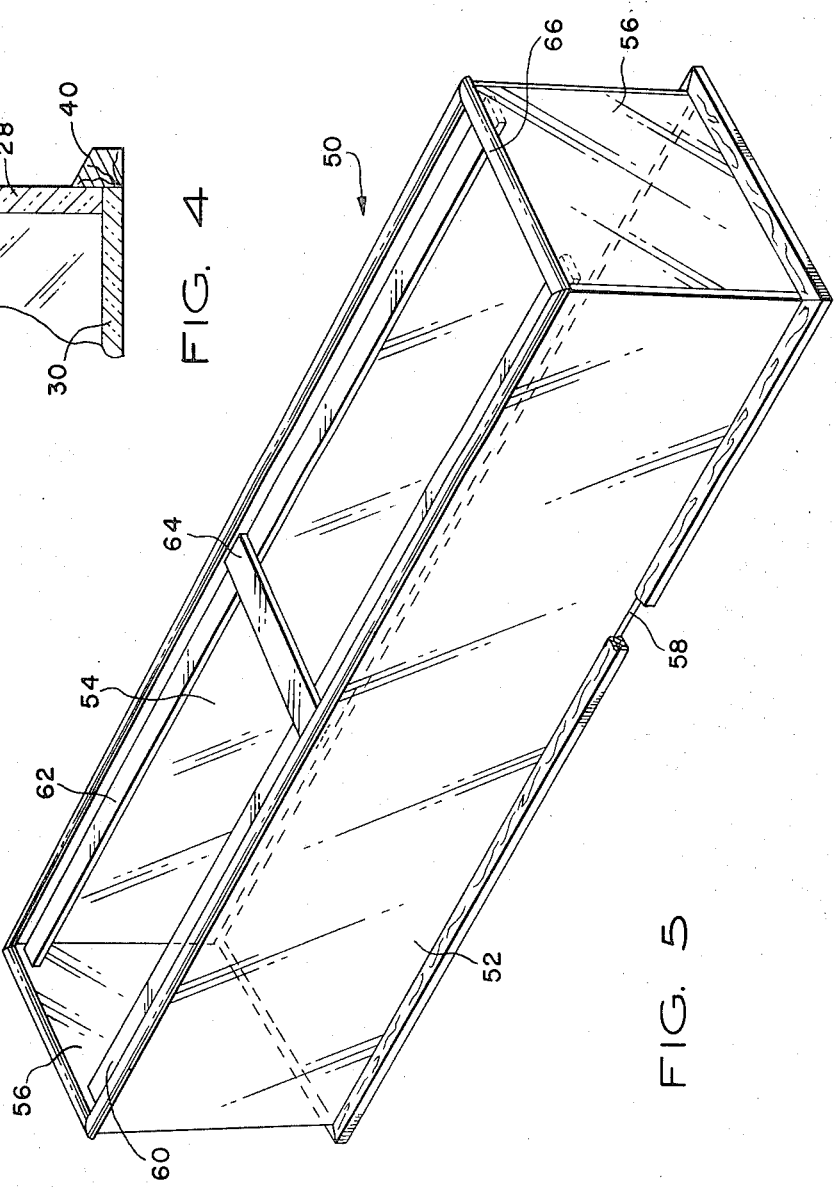
FIG. 5 is a perspective view of a third configuration of a frameless aquarium.

Turning now to FIG. 5, an alternate configuration is shown for assembling an even larger tank which is generally indicated by numeral 50. This larger tank 50 can have external dimensions of 18 inches by 18 inches by 72 inches and can be constructed from ¼-inch thick glass to hold approximately 100 gallons. The front, rear and side walls 52, 54 and 56, respectively, bottom 58 and lateral brace members 60 and 62 are assembled as illustrated in FIG. 2.

Figure 6:
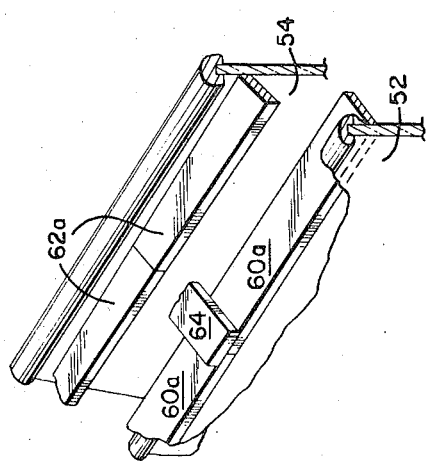
FIG. 6 is a detailed partial perspective view of a portion of FIG. 5.

A cross brace member 64 of non-corrosive material such as glass, plexiglass or the like is attached to the lateral braces 60 and 62 by a suitable adhesive material. This cross brace 64 is attached to the lateral braces 60 and 62 to prevent bowing of the central portion of the front and rear walls 52 and 54. It can also be noted that the lateral brace members 60 and 62 are positioned below the upper edges of the front and rear walls 52 and 54 respectively at a distance greater than A in FIG. 3. This distance is increased to allow for clearance of the cross brace member 64 below the acrylic molding 66 mounted on the upper edge of the four walls of the tank. It is also to be noted that the lateral braces 60 and 62 need not contact the side walls 56, thus allowing clearance for attaching an external filter on the rear wall 54. The lateral braces 62a and 64a can also be made from two separate pieces of material which are joined together under the cross brace member 64 as shown in FIG. 6.

Although it is not depicted in the drawings it is contemplated that the tank illustrated in FIG. 5 could be constructed with four rectangular walls identical in shape with front and rear walls 52 and 54, respectively. This embodiment of the tank would have a square cross section and a lateral brace could be attached to each rectangular wall. Two cross brace members could be attached to the opposite lateral braces (if necessary) to prevent bowing of the walls when the tank is full.

Obviously many other modifications and variations of the present invention are possible in light of the above teachings. It is therefore to be understood that within the scope of the appended claims, the invention may be practiced otherwise than in specifically described.

What is claimed and desired to be secured by United States Letters Patent is:

1. A frameless open top glass tank for use in holding a volume of liquid, such as water, comprising:

a rectangular shaped front wall of transparent glass material, said front wall having a length which is four times its height;

a rectangular shaped rear wall of opaque glass material, said rear wall being identical in shape and size to said front wall and being reflective on one side;

two square shaped side walls of glass material, said side walls having a length and height which is identical to the height of said front and rear walls;

said side walls being positioned in a spaced parallel relationship between and at right angles to the planes of said front and rear walls, said front and rear walls being positioned in a spaced parallel relationship with inside surfaces of said front and rear walls facing in a direction toward each other, said side walls being attached by adhesive to said inside surfaces of said front and rear walls, said rear wall being positioned with its reflective surface forming the inside wall;

a rectangular bottom of glass material, said bottom being positioned in a plane at right angles to said front, rear and side walls, the lower or first edges of said front, rear and side walls being attached to one surface of said bottom;

a first lateral brace member of glass material, said first lateral brace member being attached to the inside surface of said front wall by adhesive material adjacent the upper or second edge of said front wall;

a second lateral brace member of glass material, said second lateral brace member being attached by adhesive material to the inside surface of said rear wall adjacent the upper or second edge of said rear wall; and a cross brace of non-corrosive material attached to and extending between said first and second lateral braces, said cross brace being positioned at the center of said lateral braces and said front and rear walls.

2. A tank as defined in claim 1 wherein said cross brace is glass material.

3. A tank as defined in claim 1 wherein said cross brace is plexiglass material.

4. A tank as defined in claim 1 additionally comprising molding covering the second edges of said front, rear and side walls.

5. A tank as defined in claim 1, wherein said four walls, bottom and lateral brace member are attached together by adhesive material.

6. A tank as defined in claim 1, wherein said cross brace is attached to the lateral brace members by use of adhesive.

7. A tank as defined in claim 1, wherein said lateral brace members are shorter in length than said front and rear walls.

8. A tank as defined in claim 1, wherein said lateral brace members are assembled from two pieces with their ends butted together in the area where said cross brace is attached to said lateral brace members.

9. A frameless open top glass tank for use in holding a volume of liquid, such as water, comprising:
- a rectangular shaped front wall of transparent glass material, said front wall having a length which is twice its height;
- a rectangular shaped rear wall of opaque glass material, said rear wall being identical in shape and size to said front wall;
- two square-shaped side walls of glass material, said side walls having a length and height which is identical to the height of said front and rear walls;
- said side walls being positioned in a spaced parallel relationship between and at right angles to the planes of said front and rear walls, said front and rear walls being positioned in a spaced parallel relationship with inside surfaces of said front and rear walls facing in a direction toward each other, said side walls being attached by adhesive to said inside surfaces of said front and rear walls, said rear wall being positioned with its reflective surface forming the inside wall;
- a rectangular bottom of glass material, said bottom being positioned in a plane at right angles to said front, rear and side walls, the lower or first edges of said front, rear and side walls being attached to one surface of said bottom;
- a first lateral brace member of glass material, said first lateral brace member being attached to the inside surface of said front wall by adhesive material adjacent the upper or second edge of said front wall;
- a second lateral brace member of glass material, said second lateral brace member being attached by adhesive material to the inside surface of said rear wall adjacent the upper or second edge of said rear wall, said first and second lateral braces being attached to and extending between said side walls;
- a cross brace of non-corrosive material attached to and extending between said first and second lateral braces.

10. A tank as defined in claim 9 additionally comprising molding covering the second edges of said front, rear and side walls.

* * * * *